Feb. 27, 1962  C. A. BLAKESLEE ET AL  3,023,282
PROCESS CONTROLLERS

Filed May 29, 1959  9 Sheets-Sheet 1

Feb. 27, 1962 C. A. BLAKESLEE ET AL 3,023,282
PROCESS CONTROLLERS
Filed May 29, 1959 9 Sheets-Sheet 2

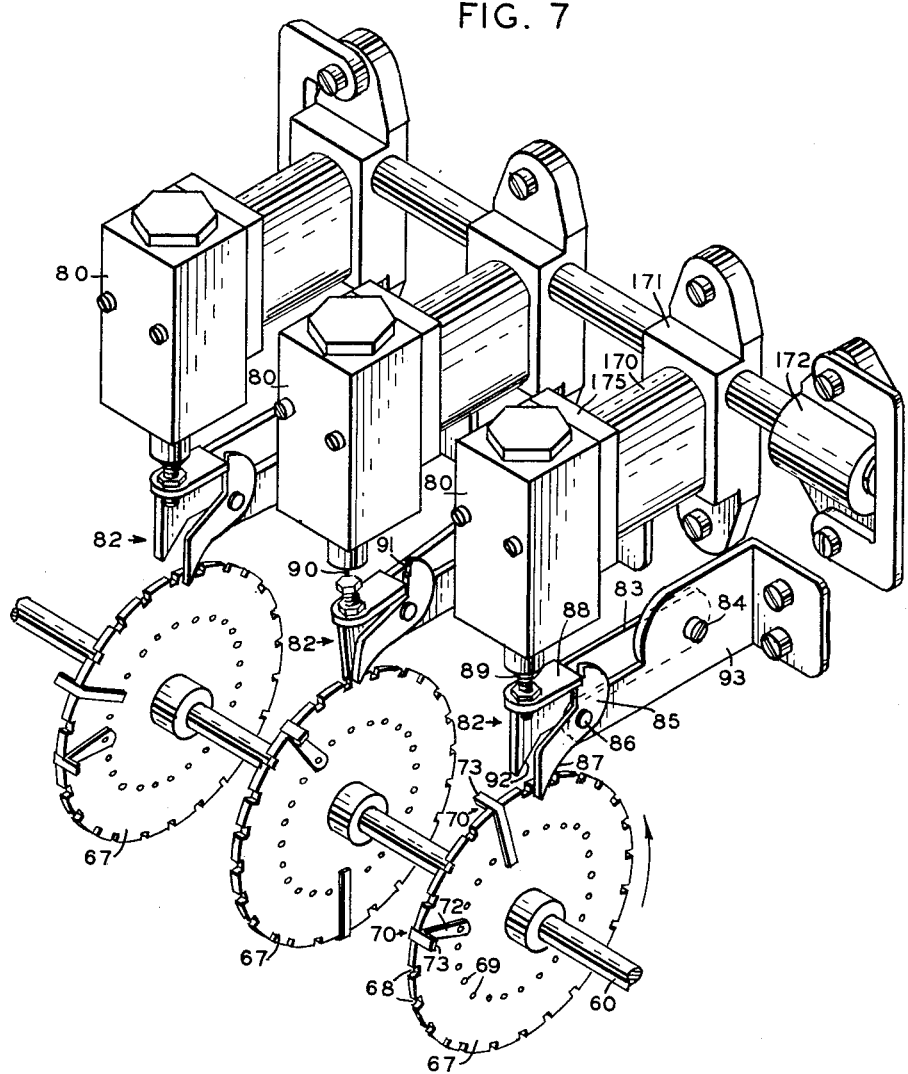

Feb. 27, 1962  C. A. BLAKESLEE ET AL  3,023,282
PROCESS CONTROLLERS
Filed May 29, 1959  9 Sheets-Sheet 5

Feb. 27, 1962  C. A. BLAKESLEE ET AL  3,023,282
PROCESS CONTROLLERS
Filed May 29, 1959  9 Sheets-Sheet 9

United States Patent Office 3,023,282
Patented Feb. 27, 1962

3,023,282
PROCESS CONTROLLERS
Clinton Alfred Blakeslee, Middlebury, and Ernest Freemont Dyson, Cheshire, Conn., assignors to The Bristol Company, Waterbury, Conn., a corporation of Connecticut
Filed May 29, 1959, Ser. No. 816,787
29 Claims. (Cl. 200—38)

Our invention relates to automatic process controllers, especially controllers of the time-cycle or program class by which a predetermined series of individually timed or related unit operations is caused to happen in an established sequence within a preselected interval of time.

Practical designs of program-control instruments commonly strive for accuracy of timing of the operations and also for versatility, since a single controller should preferably be readily adaptable to selection of a wide range of time values, to control of a reasonable number of unit operations, to ready selection of any sequence of control operations, and to the selection of either pneumatic or electric switching of final control elements or combinations thereof.

It is apparent, therefore, that a practical apparatus of this type should perform the following functions:
 (a) Timing of the complete cycle of events;
 (b) Timing of the individual operations;
 (c) Establishing of the sequence of operations;
 (d) Initiating of the control of the final control element; and, to complete the cycle,
 (e) Resetting of the apparatus to a standard reference condition or state.

The present invention provides a control instrument of this class which is especially versatile, providing simple and positive means for adaptation to a large number and variety of process operations.

More specifically, the invention provides a control instrument of this class in which automatic resetting of the cycle is accomplished by novel interconnection means between the timing drive means and the power drive means.

The invention further provides a control instrument of this class in which positive interlock is provided between the timing operation and the sequencing mechanism.

Also, the invention provides a control instrument of this class in which novel selecting means are provided on the sequencing, or indexing, device, for easily and positively establishing control positions thereon and for making changes therein.

Further, the invention provides a control instrument of this class in which means are provided for readily mounting and demounting pneumatic relay pilot valves either singly, or in groups, without requiring interconnecting manifold, and with a minimum number of screws or other permanent fittings.

Other features and advantages will be hereinafter described and claimed.

In the accompanying drawings:

FIGURE 7 is a fragmentary, front perspective view of the operating cams, the pilot valves and the latching mechanisms therebetween, in accordance with the assembly of FIGURE 1;

Figure 1:
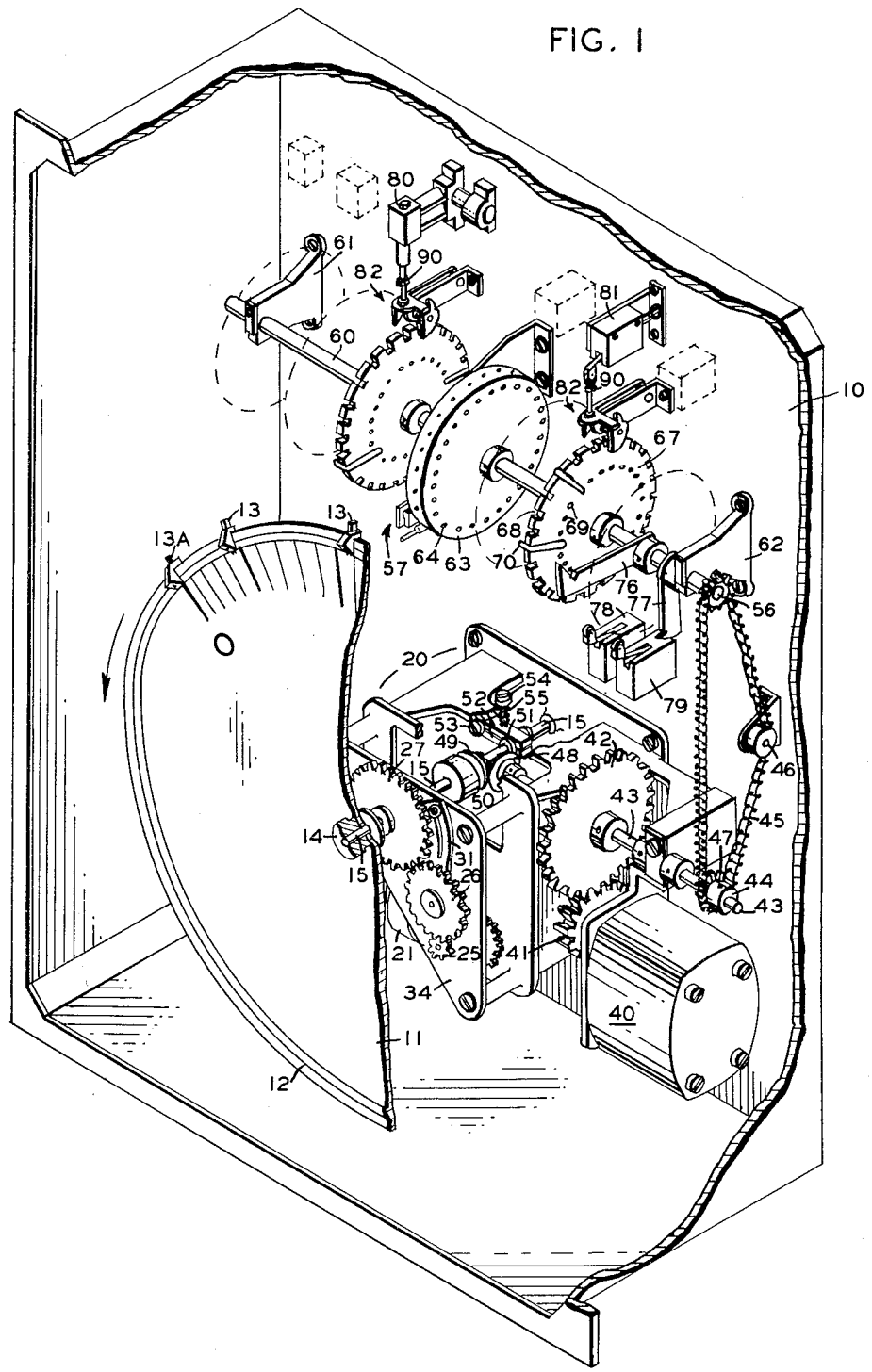
FIGURE 1 is a front elevation in perspective of a cycle-control instrument according to our invention partly broken away to show internal details.
Figure 5:
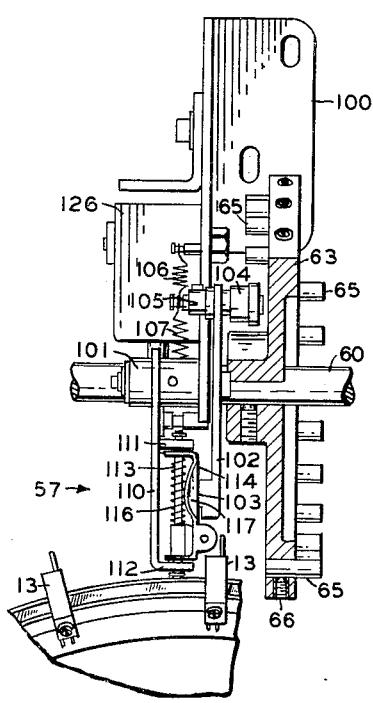
FIGURE 5 is a fragmentary view, partly broken away, showing details of the indexing mechanism of the embodiment of the invention of FIGURE 1.

Referring now to FIGURE 1, casing 10 encloses the essential mechanism of the cycle controller. For convenience in description, the controller may be considered as consisting of (a) a master timing means, (b) a sequencing unit, and (c) control operators to which are connected appropriate process elements.

Timing Means

Figure 2:
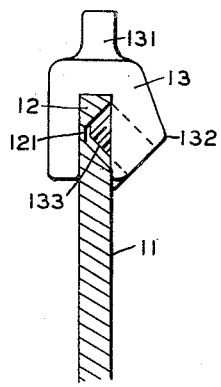
FIGURE 2 is a fragmentary view of the timing dial and a timing "dog" shown in FIGURE 1.
Figure 8A:
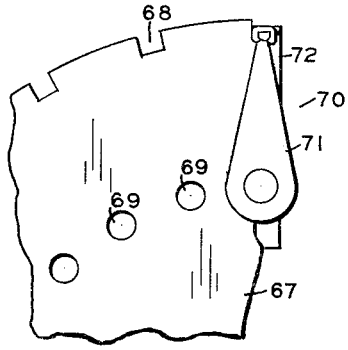
FIGURES 8A and 8B are fragmentary details in front and side views of the demountable pilot-valve actuator pin illustrated functionally in connection with FIGURE 7 above.
Figure 8B:
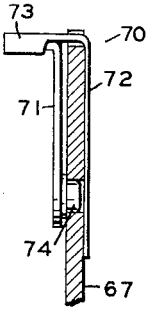

This comprises a timing element, shown as a dial member 11 fixed at its center to the end of shaft 15 by a clamp nut 14. On the face of the dial are inscribed indicia representative of graduated values of time duration from a reference point marked "0." A motor 21 of the synchronous type rotates the dial through a predetermined range of time durations depending on the motor speed and the variable-speed ratio of the gear box 20 according to principles which will be more fully discussed hereinafter. On the rim 12 of the dial member 11 is a circumferential track in which are placed movable dog members 13 which may be individually disposed on the track at various positions corresponding to desired time values as indicated by the inscribed indicia. In FIGURE 2 may be seen a detaled view of a typical dog member 13 in its functional relation to the dial rim 12. The dial itself is commonly made of a circular plate of aluminum and at the rim thereof is formed a V-shaped groove or track 121. The dog member is U-shaped to fit closely over the edge of the rim and bears an extension or projection 131 whose function will be more fully discussed hereinafter in connection with the operation of the sequencing unit. One arm 132 of the U-shaped dog member 13 extends below the groove 121 of the dial plate and is triangularly shaped in cross section in order to accommodate a set-screw 133 set at an angle generally perpendicular to the outer face of the groove or track 121. Now, it will be apparent that, when the set-screw is fully withdrawn, the dog may be removed from the dial rim but, as the screw is driven forward, it will prevent the dog from falling off or being removed though still permitting free movement along the peripheral track. As the screw is driven farther, it engages the side of the track and locks the dog at any desired point.

The gear box 20 of the timing unit may now be described in greater detail with reference to FIGURE 1 and also to FIGURES 3 and 4. Measurement of time is accomplished basically by the synchronous timing motor 21 mounted on the frame of gear box 20 and adapted for energization by an electrical voltage of standard frequency. Fixed gear members 22, 23, and 24 transmit the rotation of the motor, reduced by an appropriate ratio in accordance with well-known principles, to changeable gear members 25, 26, and 27 mounted on an outside mounting plate 34 of the gear box for accessibility. Recognizing that dial speeds must be available for various ranges of time values, speed changes are provided by substituting gears of different diameters for gears 25, 26, and 27 in selected combinations. Gears 25 and 27 operate about the fixed centers 28 and 15, respectively; gear 26 operates from either of two centers 29 or 30, both of which are borne by a plate 31 itself movable about the center 15 and adapted to be held in any desired position within the range of a guide slot 36 by clamping screw 33. This movement provides for adjustment of variable distance between the gears 27 and 25 for different gear diameters. The auxiliary stud 30 may be used alternatively with center 29 for providing further gear combinations and, thus, other timing ranges. The output motion of this gearing drives shaft 15 in a sense to increase the readings of time on the dial, i.e., counter clockwise in this embodiment.

Further functions of the timing unit comprise (a) supplying power for the sequencing unit and (b) resetting of the timing dial back to zero after the cycle of operations is completed.

Considering these in order, the source of power is derived from the drive motor 40 mounted in the common frame with the timer unit. This motor is reversible and geared to drive shaft 43 through speed-reducing gears 41 and 42. On the outboard end of the shaft 43 is mounted a sprocket wheel 47 and a chain 45 engaging therewith for transmission of power to the sequencing unit in a manner that will be presently described. Intermediate between the shaft 43 and the drive sprocket 47 is a clutch member 44 which provides that the sprocket will be driven in one direction only; that is, if the motor is reversed, no power is transmitted to the drive chain. Since over-running clutches of this sort are well known, no discussion of their operation is considered necessary here. (As an example, there may be noted, U.S. Patent 2,633,951, issued April 7, 1953.)

To understand the function of the resetting mechanism, it should be first understood that, in normal operation, the drive motor 40 supplies power intermittently in one direction through the chain drive 45 to the sequencing unit in a manner yet to be described in detail. Furthermore, at the end of a cycle of operations, the timing unit must be returned to its zero position. This resetting operation is accomplished by reversing the motor 40 whereupon, through the action of clutch 44, the power in the "forward" direction to the drive for the sequencing unit is instantly cut off.

Now, it will be seen that the movements of drive shaft 43 are also communicated to the bevel gear 48 fixed to it and, thus, to the mating bevel gear 49 mounted on the timer shaft 15 at right angles to the first shaft. But clutch 50, attached to gear 49, provides for transmission of power from shaft 43 in only one direction; in fact, in the direction opposite to the "forward" direction in which power is supplied from the motor 40 to the sprocket 47. Hence, for rotation in the sense that clutch 44 is engaged, power is being transmitted from the motor 40 to the chain drive 45 and, at the other end of drive shaft 43, clutch 50 is disengaged and gear 49 merely slips on shaft 15. Now, when motor 40 is reversed, clutch 44 disengages the chain drive 45 and clutch 50 engages with shaft 15. But, as hereinbefore described in connection with the timing unit, shaft 15 is already in motion, and in the same direction as in the last mentioned condition, driven by the clock motor 21 through intermediate speed-adjusting gearing. The operation of clutch 50, therefore, is to override the timed movement of the dial 11 by a higher speed movement in the same direction in order that, following the cycle of process operations, the dial may be quickly brought back to the zero or reference point. A further overriding clutch member 32 (FIGURE 4) is provided on shaft 28, in association with gear 24 intermediate to the fixed gear 23 and the changeable gear 26, so that, at the higher speed, the driving motor 40 will be effectively disconnected from the slower speed timing motor 21 and at least part of its associated gearing. The placing of this latter clutch 32 is a matter of convenience, since it simply acts in parallel with clutch 50 but associated with the timing motor drive, permitting, thereby, that the drives will be independent of each other and that the dial will be driven at the higher speed of the two sources of power. The control of these operations will be described hereinafter.

In addition to the above-mentioned functions of the overrunning clutches 44, 50, and 32, it may be noted that they present the additional advantage of permitting ready manual adjustment in one direction of the timing dial 11 as well as the shaft 60 of the sequencing unit.

In order that the system be "dead-beat," that is, that the timing indicator dial 11 will stop instantly when the power is removed from the timing motor, and that there will be no errors in timing due to "coasting" of the motors or due to tendency of the timing dial to move by reason of unbalance caused by the weight of the dogs 13 on the dial rim, a friction brake is applied to the dial shaft 15 (see FIGURE 1). Mounted on the shaft is a brake drum 51. Engaging frictionally the upper and lower surfaces of this drum are a pair of brake levers 52 pivoted at 53. An adjusting screw 54 passes through a clearance hole in the upper lever member and into a threaded hole in the lower lever. A spring 55 surrounding the screw exerts pressure on the upper lever and tension on the lower, and the clamping action on the brake drum is thereby adjustable.

*Indexing or Sequencing Means*

The second element of the controller, the indexing or sequencing means, may now be described in appropriate detail in connection with FIGURES 1, 5, 6, 7, and 8. Suitably juxtaposed to the timing dial within the common housing 10, an elongated shaft 60 is mounted between pillow blocks 61 and 62 perpendicular to the axis of the timing dial. Between the ends of this shaft there is fixed a drum member 63 having a plurality of actuator pins 65 located in regularly spaced holes 64 near its periphery. These pins are held in place axially by radial set-screws 66 and are adapted to protrude on one side or the other of the flange member 63 as desired.

A number of discs or cams, of which 67 is typical, are disposed on the shaft, each one representative of a process element to be controlled and each determines the control actions to be performed by the control element. These programming cams 67 are formed with slots 68 cut radially in the rim at regular intervals. Spaced radially therefrom are holes 69. The combination of slot and hole accommodates an actuator member 70 which is shown in detail in FIGURES 8A–8B. As shown, each of these consists of two L-shaped members 71 and 72 of spring steel which are joined by welding at a common area forming the actuator pin member 73, the overlapping edges of the upper member being rolled over the lower member to stiffen the assembly. The longer ends of the L-shaped members are held separated one from the other by a button 74 installed in the lower, paddle-shaped member 71. On installation, the arms 71 and 72 may be spread over the edge of cam 67 and moved until the shoulder of pin 73 falls into the particular slot 68 desired and the button 74 snaps into the corresponding hole 69. The orientation of the pin member 73 may be to the right or to the left since the two sides of the plate are identical. The pins are easily removed by pulling radially to disengage the button 74 from the hole 69. At the same time, they are positively locatable in desired positions on either side of a cam 67 without the use of screws or other fastening means, with resultant minimizing of the time required to set up a process program.

Each of the pins 70 just described, when installed in one of the operation cams 67, represents an operation of a switch member 80 or 81. This may be the well-known plunger-operated pneumatic pilot valve type (80) or the equally well-known snap-action electrical switch type (81). In either case, a latching mechanism 82 is interposed between the actuator pin 70 and the switch member in order to hold the said switch either open or closed until the opposite action is initiated by the pin arm 73. The two positions of the pin, on the right or left side of the cam, form the means for initiating the "on" or "off" action of the latching device as will be presently described. The number and position of pins on any cam thereby determines how many times the juxtaposed switch member is turned on and off in a given revolution of the cam.

The latching mechanism is seen in detail in FIGURE 7. The mounting bracket 93 bears an arm 83 pivoted at 84 and a shorter arm 85 pivoted at 86. Arm 83 has a small right-angle shelf 88 formed at its outer end in which is screwed an adjustable anvil member 89 on which the operating pin 90 of the valve or switch member may rest. The small arm 85 is notched at 91 to receive the corner of shelf 88 under certain conditions. Both arms act as cams at their edges 87 and 92 in cooperation with the actuating pin arms 73. Assuming that the rotation of the cams 67 is counter-clockwise (facing from the right), it will be seen that a pin arm 73, on the right-hand side (viewed from the front) of the cam 67, will engage the cam surface 87, and thereby raise the arm 85, disengaging the notch 91 from the shelf 88 and allowing the arm 83 to fall. The operating pin 90 of the switch also falls and operates the pneumatic valve or electrical switch in one of its two states. The arm 85 remains in an unlatched condition until a pin arm 73, on the left hand side of cam 67, engages the cam section 92 of arm 83 and lifts the arm, thereby raising the switch pin 90 and also engaging the shelf 88 in the notch 91. This action holds the switch in the other of its two states until a subsequent actuator pin unlatches the mechanism.

The sequencing or indexing drum 63 (FIGURE 1) controls the operations of operating cams 67. This is done in cooperation with the timing dial 11 and the pins 13 located thereupon. The operating mechanism intermediate between the indexing drum 63 and the timing dial 11 is shown in detail in FIGURES 5 and 6. This mechanism is mounted on the bracket 100 on the outer end of which is a pivot post 101. An arm 102 is pivoted on post 101 intermediate its ends. At one end of this arm, the metal is formed into a projection 103 perpendicular to the arm portion, said projection being adapted for engagement with another arm yet to be described. At the other end of the arm 102 is a pivot post 105 forming a bearing for roller 104 journaled thereon. This arm 102 is normally restrained in a position in which post 105 rests against the edge of bracket 100 through the force of a tension spring 106. It is clear, however, that as indexing drum 63 rotates, leftward-extending pins 65 therein will engage the roller member 104 and cause the arm 102 to be rotated through a small angle. The significance of this motion will presently be made clear.

Figure 6:
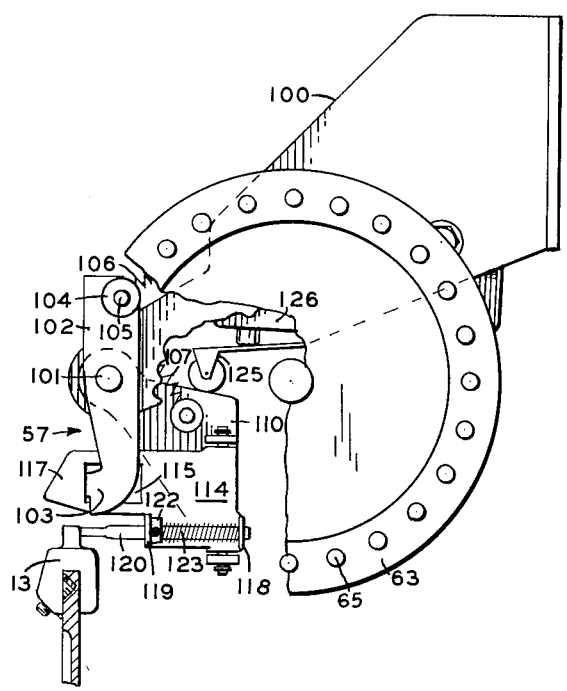
FIGURE 6 is a fragmentary side view of the mechanism of FIGURE 5, also partly broken away, to reveal details of operation.

Spaced from the above-mentioned first arm 102, but, like it, pivoted about post 101, is a second arm 110, portions of whose flat surface are formed into two juxtaposed lugs 111 and 112 drilled to accommodate a shaft member 113. Supported by and pivoted on the shaft 113 is latch member 114 formed with an opening 115 adapted to engage the projection 103 of arm 102 when said arm is rotated counter-clockwise as seen from the right. The torsion spring 116 provides a force tending to rotate the latch 114 in a direction toward the mating projection on arm 102. Furthermore, the nose portion 117 of the latch member 114 is bent away from the projection 103 so as to provide camming surface as the juxtaposed parts approach the latching position. Further lugs 118 and 119 formed on the latch member 114 are drilled to provide slideable supports for the actuator pin 120 (FIGURE 6). The collar 122 limits the translatory movement of this pin, and a light, compressible spring 123 urges the pin to its fully extended position whence it engages with the timing dogs 13 of the dial 11 for the purposes of our invention further discussed hereinafter.

The arm 110 is biased by spring 107 to turn the latch assembly in a counter-clockwise rotation (viewed from the right as in FIGURE 6) about the pivot 101. At an edge of arm 110, rolling engagement is made with switch actuator arm 125. The switch 126 itself may be of the well-known single-action type of the "Micro-Switch" class. When the latch member 114 is disengaged from the projection 103 of arm 102 by action of a dog 13 on pin 120, the arm 110 flies back to the right, causing the switch arm 125 to be raised and the switch 126 to be operated. This normally causes rotation of shaft 60 and index drum 63 and, through the engagement of a pin 65 with roller 104, the latching projection 103 is moved counter-clockwise to engage the latch aperture 115, whereby, as the pin 65 moves out of engagement with roller 104, spring 106 returns the arm 102 to its normal position. During that return movement of the arm 102 the latter, through the engagement of its projection 103 with the latch 114, swings the arm 110 clockwise back into its position shown in FIG. 6, wherein switch 126 is restored to its normal "off" position.

At this point, while dealing with the sequencing mechanisms, it may be observed that power is transmitted to the shaft 60 through the chain drive 45 already referred to. This chain passes over an idler roller 46, keeping the chain reasonably taut and free of back lash, and engages the gear 56 on the shaft 60.

Furthermore, mounted on shaft 60 may be other cams providing for single operations, such as cams 76 and 77 (FIGURE 1). These are so oriented on the shaft to operate the corresponding snap-action switches 78 and 79 at predetermined points in the process cycle.

The operation of the sequencing mechanism may now be described as follows. Assuming the timing dial 11 to move in a counterclockwise direction (see particularly FIGURES 5 and 6), a dog 13 engages the pin 120 and, through it, deflects the arm 114, against the force of torsion spring 116, thereby unlatching arm 114 from arm 102. The arm 110, urged by spring 107, flies back in a counterclockwise direction (FIGURE 6) and raises switch arm 125 causing the switch 126 itself to close. This closure acts to energize the drive motor 40 (FIGURE 1) in a direction such that clutch 44 will be engaged and will transmit power to rotate the shaft 60 in a counterclockwise sense looking from the right. Now the rotation of disc 63 brings a pin 65 into engagement with roller 104, first causing deflection of arm 102 in a counterclockwise sense (FIGURE 6) whereby outer end 103 reengages the latch hole 115 of arm 114. As the roller 104 and pin 65 disengage, the arm 102, urged by spring 106, returns to its normal position, pulling the arm 110 with it into a reset position, and causing the opening of the switch 126, thereby stopping the drive motor 40. It may be noted here that the pin 120 is spring-loaded for retraction. If the dial 11 be set by hand into a desired position, a dog 13 thereon may deflect the pin 120 and initiate rotation of the shaft 60, followed by resetting of the pin 120 into normal position. However, the unsynchronized manual operation of the dial 11 may have so located a dog 13 that the pin, in moving toward normal position, makes contact with the dog. The slideable mounting of the pin in the brackets 118 and 119, and the provision of the light biasing spring 123, enable the pin to return fully to its normal position when the interfering dog has passed.

It may be further noted that, while the shaft 60 is moving, one or more of the cam members 67 are causing operations of the control switches or pilot valves 80 or 81 through the tripping mechanisms 82 (FIGURE 1) as hereinbefore set forth.

Figure 9:
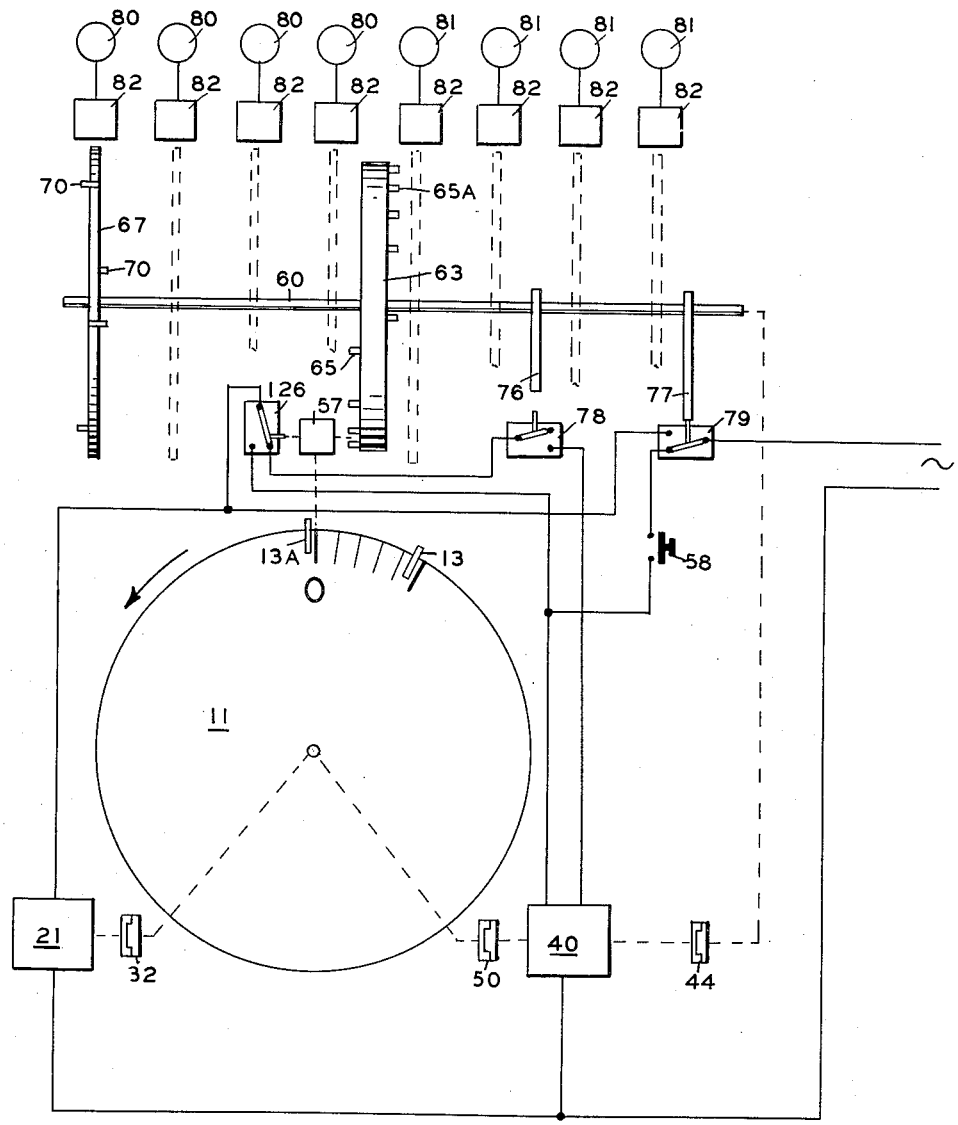
FIGURE 9 is a diagrammatic representation of the cycle controller of FIGURE 1 showing typical electrical interconnections.

It will be apparent that the above-described mechanism is capable of performing control functions of great complexity. In order to further illustrate the performance of our invention on a relatively simple basis, the schematic wiring diagram of FIGURE 9 is provided to show a typical interconnection of the electrical elements of the circuit. The dial 11 is driven by timing motor 21 through clutch 32 or, under conditions of resetting action, by the higher speed, reversible drive motor 40 through clutch 50. Normally, however, motor 40 supplies driving power to the shaft 60 through one-way clutch 44. The operating shaft 60 bears the disc 63 associated with which is the indexing mechanism indicated on the diagram by a box 57 between the disc 63 and switch 126. The operating cams 67 and associated trip mechanisms 82 for the control pilot valves 80 and switches 81 are also indicated. Also mounted on the shaft 60 are indicated two single-operation cams 76 and 77 by which switches 78 and 79 may be operated at specific points in the cycle of operations as will now be described in connection with the diagram.

In the circuit as shown, the apparatus is at rest awaiting the initiation of a cycle of operations. The timing dial 11 rests at zero, which position is further marked by the dog 13A, as shown, for the purpose presently to be set forth. Cam switch 79 is held in the operated position by reason of the orientation of the cam member 77 on shaft 60 and, in this position, acts to cut off all power from the motors 21 and 40. Now, to start the cycle of operations, a push button 58, or any equivalent means for manually or automatically making a momentary contact, may be operated to bypass briefly the open contacts of switch 79, thereby to supply power to motor 40 to effect operation in a "forward" direction and rotate the shaft 60. The push button is held closed long enough so that the indexing mechanism 57 engages an initial indexing pin 65 of drum 63 and thereby closes the normally open contact of switch 126. Immediately thereafter, the cam 77 allows the normally closed contacts of switch 79 to open, thus opening the push-button bypass circuit, and also closes the normally open contact of switch 79 which thereby (a) supplies power to the timing-dial drive motor 21 starting thereby the timing function of the controller and (b) supplies power to switch 126 under control of which the operation of the motor 40 now proceeds. During rotation of the shaft 60, the location of operating pins 70 in cams 67 has initiated various desired control actions through the agency of the pilot valves 80 and switches 81 as demanded by the specific process. Finally, when the pin 65 disengages from the indexing mechanism, the switch 126 returns to the normally open position and motor 40 stops. From this point, the indexing is under the control of the timing dial 11 wherein each successive dog 13 at the proper time initiates the indexing movement, and each succeeding pin 65, by actuating and releasing the arm 102, terminates the operation until the next dog 13 operates the pin 120. In general, there, is after the zero position one dog 13 on the timing dial for every operative indexing pin 65 on the disc 63. Pins such as 65A projecting to the right are inoperative.

Resetting to Zero

In an actual process, not all of the indexing positions or pins may be required; also, the timing of a given process cycle may not require the full timing range of the dial. It is, therefore, desirable on the completion of a process cycle to reset the apparatus as rapidly as possible to a zero or reference position. In the present embodiment, this is done by providing that the last operating dog 13 in use shall trip the indexing mechanism 57, whence the disc 63 will advance uninterruptedly over the unused index positions where all intervening index pins have been inactivated (65A, for example) except a final pin whose action is to reset switch 126 and stop the motor 40. At this point, however, a second single-operation cam switch 78 is so positioned that its normally open contacts become closed, whereby it supplies power to the reversing field of motor 40. As described in the foregoing, the action of this reversed motor operation is to drive the dial plate 11 toward its zero position in the same direction but at a greatly accelerated rate, the shaft 60 remaining stationary. The dog member 13A, situated at the zero position of the dial, finally trips the indexing mechanism 57. This opens the normally closed contact of switch 126 and thus the reversing circuit of motor 40, whereupon the timing dial is stopped at the zero point. It also closes the normally open contact of this last-named switch, energizing the forward field of the motor, and causing the indexing wheel to advance to its final position between two predetermined pins 65. At this point, the first cam-operated switch 79 is operated and power is thereby removed from both motors. Also, the cam switch 78 is restored to its normal position wherein its contacts are open. The system is now ready for repetition of the established cycle of operations.

Mounting for Groups of Pneumatic Pilot Valves

Figure 10:
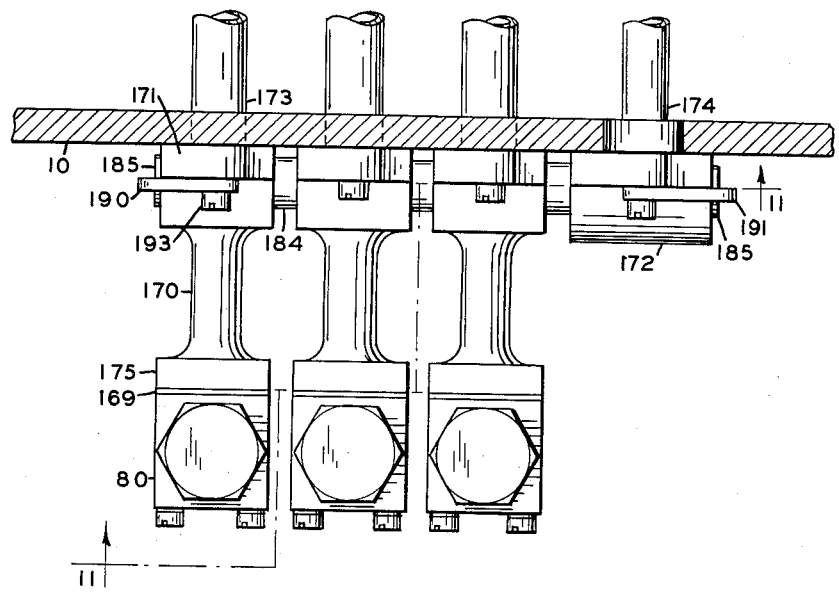
FIGURE 10 is a plan view of the pilot valves of FIGURE 1 illustrating the method of mounting of multiple valves in accordance with the invention.

In dealing with multiple pneumatic operations in a controller of this class, it is highly desirable to conserve space and provide for convenient interchangeability. To that end we have provided novel means for "ganging" groups of pneumatic pilot valves, which will now be described in connection with FIGURES 7, 10, and 11. Herein, as has been noted before, the pneumatic pilot valves 80 are of conventional design and may be, for example, the type described in U.S. Patent 2,831,465 to Perry, issued Apirl 22, 1958. The valves 80 are shown secured to mounting plates 175 by screws engaging with the tapped holes in the mounting plate. Gaskets 169 seal the inlet and outlet (not shown) of each valve to the supply and controlled-air piping, respectively, when the valve is fixed in place. Each mounting block consists internally of the mounting plate portion 175, pedestal portion 170, and base portion 171. The spacing and extensions of the mountings are such as to bring the valve pins 90 in proper position for engagement by the tripping mechanisms hereinbefore described in connection with FIG. 6.

Figure 11:
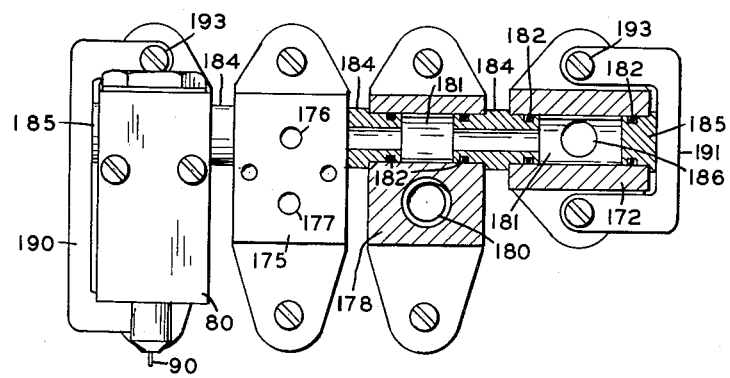
FIGURE 11 is a view in elevation of the pilot valve mounting, with parts in transverse horizontal section (on lines 11—11 in FIG. 10)

The mounting plate 175 and pedestal 170 are drilled with two holes 176 and 177 which, on mounting of the valve, mate with its inlet and outlet ports (not shown). The base portion 171, as shown by FIGURE 11, is provided with a vertically drilled hole 181 and a horizontally drilled hole 180. The latter connects the outlet port of the valve to the external conduit 173 carrying the controlled air to or from process-control members. In the holes 181 are placed connector members 184 formed of short lengths of metal tubing, the ends of which are recessed to form abutments to limit the insertion into the holes 181. In each of these connectors 184, in close proximity to the ends thereof, grooves are cut into which are fitted O-rings 182 of rubber or similar self-sealing material. Series connection of the air supply to groups of these pilot valves may thus be arranged by simply plugging these self-sealing connectors between successive base members. A terminal fitting 172 (FIGURE 10) provides for terminal connection to the common air-supply conduit 174 through a vertically drilled hole 186 (FIG. 11) tapped for any of various screw fittings for connection to external conduit 174. A plug fitting 185 is formed in a similar manner to the connector elements except that it is solid. In both cases, the friction provided by the O-rings is made sufficient to seal off the supply passageway from leakage and also from coming apart under internal pressure. To insure that end fittings 185 will not be forced out, however, a retaining bracket may be provided. These are stirrup members 190 and 191 (FIGURES 10 and 11), for example, in the form of C-shaped brackets adapted to be inserted under the mounting screws 193.

*Modified Form of Timing and Drive Unit*

Figure 3:
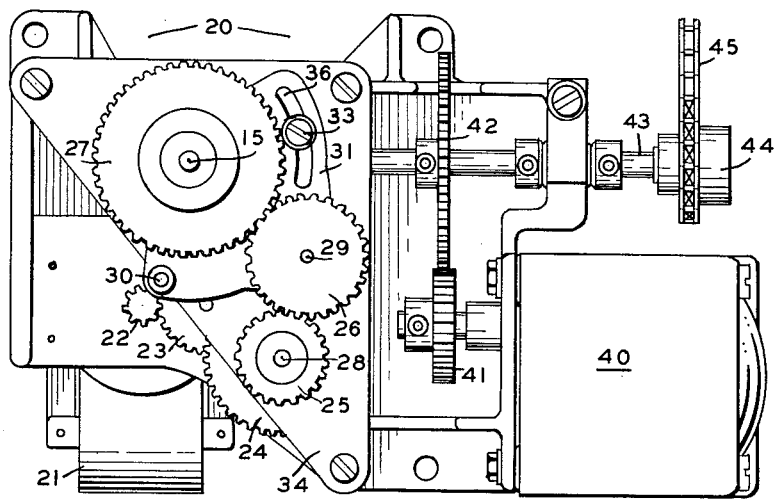
FIGURE 3 is a front elevation of the controller drive unit of FIGURE 1 showing details of gearing.
Figure 4:
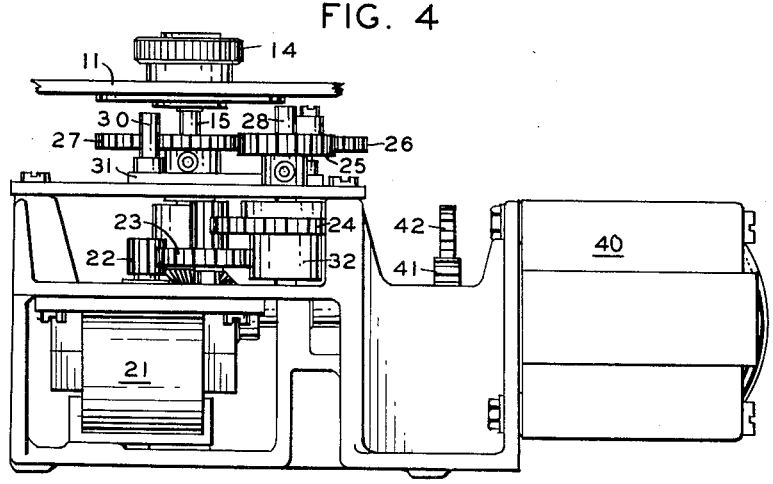
FIGURE 4 is a view of the drive unit of FIGURE 3 seen from below to show further details of internal gearing.
Figure 12:
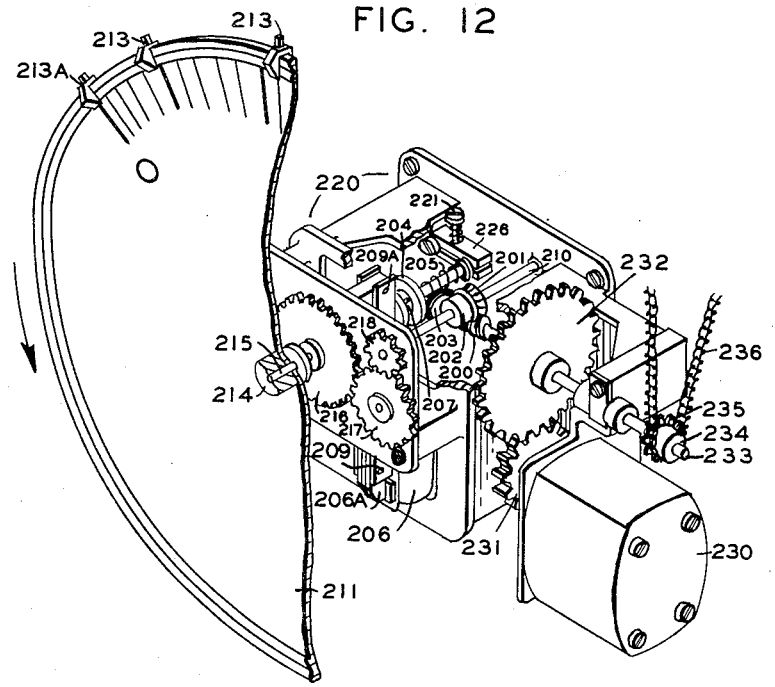
FIGURE 12 is a front elevation of an alternative form of cycle-controller drive unit, partly broken away to show details of the gearing.
Figure 13:
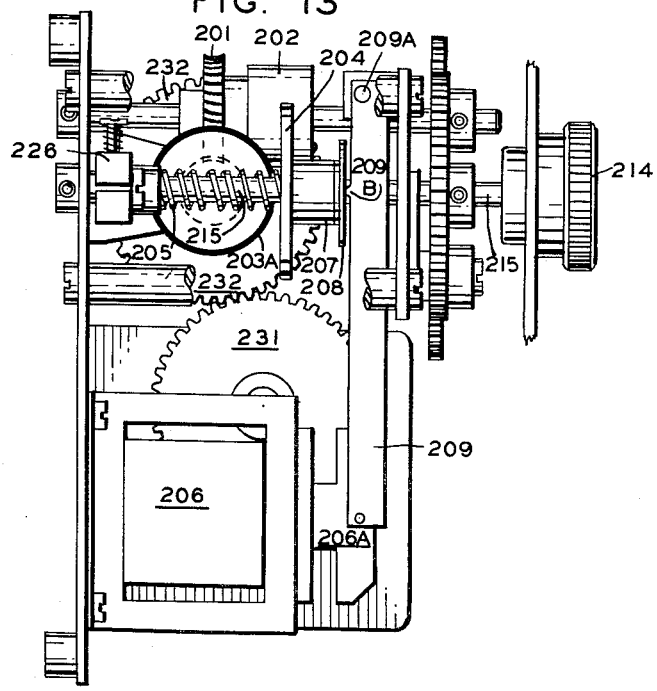
FIGURE 13 is a left side view of the drive unit of FIGURE 12, partly broken away to show internal details.

A form of the timing and drive unit alternative to the form already described is shown in FIGURES 12 and 13 and may be described as follows:

It is provided herein that this alternative drive unit numbered 220 will be interchangeable with the unit 20 of FIGURES 1, 2, and 3. It differs in principle mainly in providing a single motor to accomplish all the required functions of the two motors of the earlier embodiment, namely (1) timing, (2) drive of the sequencing mechanism, and (3) resetting at the end of a cycle of operations.

The motor 230 here furnishes all motive power. It is of a synchronous type operating at a constant speed when supplied with alternating current of fixed frequency. It is coupled to the drive shaft 233 through the gears 231 and 232 and, for one direction of rotation, is coupled to the chain drive 236 through the over-running clutch 234 which can be any of a number of well-known commercial types as specified in the above-described embodiment. Also on shaft 233 and rotating with it is a worm 200 which meshes with worm gear 201. This gear 201 is coupled to shaft 210 through a second over-running clutch 202 by which it is arranged that shaft 210 moves only when the motor is moving in the opposite sense from that in which it is supplying power through chain drive to the sequencing unit. Under this condition, shaft 210 moves gear 218 on the gear train, which includes also gears 216 and 217, and turns the timing dial 211. The interchangeability of the gears of this train and, thus, the establishment of the timing range of the system can be accomplished in the same manner as in the first-described embodiment.

The resetting function takes place through the following means: On the inner end of shaft 233 is mounted a wheel 203 bearing on its periphery a frictional element, or "tire," 203A of rubber or a similar material. Juxtaposed to this wheel and adapted for frictional engagement therewith is a friction plate 204. The latter includes a mounting bushing 207 and is splined to the timer dial shaft 215 so that it may rotate with said shaft and also be capable of axial movement. In this case, a spring 205 normally urges the disc 204 to the right (FIGURE 13) and out of engagement with the driving wheel 203. Straddling the shaft 215 is a double-bar lever member 209 which is pivoted at its upper end at 209A and bears on the friction disc bushing 207 through an interposed washer 208 at point 209B. The lower end of this bar attaches to the solenoid plunger 206A which is operated by the solenoid 206.

In operation, for normal timing, the motor 230 operates the timing dial 211 through the speed-reducing gearing consisting of the worm and pinion 200, 202, and the gear train, 218, 217, and 216. Meanwhile, the clutch 234 disengages the drive chain 236 and, at the other end of the shaft, the friction drive elements 203 and 204 are also disengaged. Now, as hereinbefore described, a driving impulse for the sequencing mechanism (effected through operation of the indexing mechanism 57 and switch 126 by a pin 13 on the timing dial) acts to reverse the direction of rotation of the motor. In this reverse direction of motion, the clutch 234 engages the gear 235 and the chain drive 236 is moved. But now the clutch 202 disengages the shaft 210 during the brief period of power drive and, thus, interrupts the timing operation. This brief interruption may be considered to introduce no more than negligible or immaterial changes in timing, particularly in installations wherein some variations of the times at which operations are initiated and terminated are permissible. Finally, when the cycle of operations of the control cams 67 has been completed, the solenoid 206 is caused to be energized in the manner hereinafter described. Through the considerable mechanical advantage of the lever arm 209, the disc 204 is forced into engagement with the wheel 203 and, thereby, the timing shaft 215 is turned at the same speed as the drive shaft 233. While the driving of the timing shaft 215 at the higher speed causes the gear members 216, 217 and 218, as well as shaft 210, to operate at the higher speed, the clutch 202 will not engage and, thus, there is no interference resulting from the different speeds of the shafts 233 and 210. The effect is, therefore, during the resetting period to drive the timing dial at a much accelerated rate but in the normal direction until the zero or reference position is reached. As in the previosuly described embodiment, at the zero position the dog 213A co-acts with the indexing mechanism 57 whereby power is switched off the controller and members 204 and 203A are left in a de-clutched state. The apparatus is then in condition for re-cycling operations.

Figure 14:
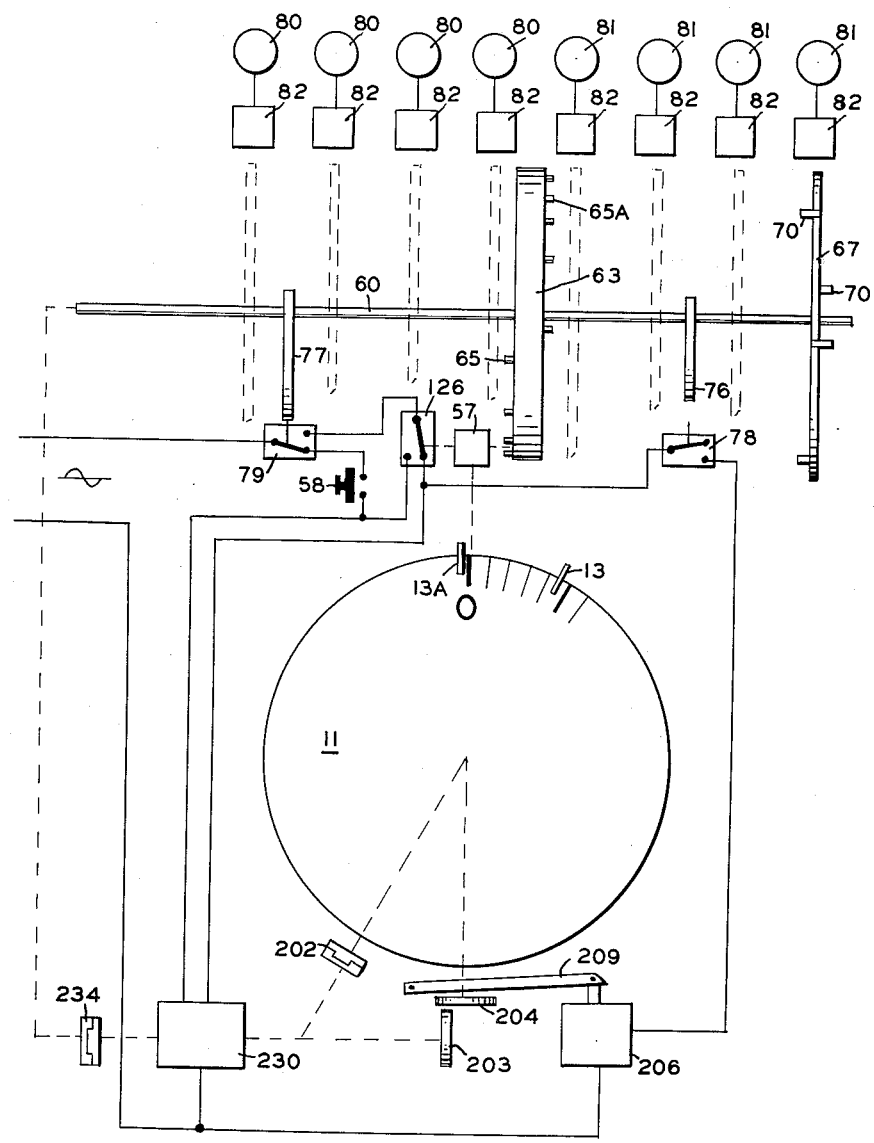
FIGURE 14 is a diagrammatic representation of the cycle-controller illustrated in FIGURES 12 and 13, showing electrical circuit interconnections.

A typical circuit showing electrical interconnection of elements according to this alternative embodiment is shown in FIGURE 14. In this case, the single drive motor 230 rotating in one sense drives the timing dial 11 through one-way clutch 202 and, at the same time, drives the reset wheel or disc 203, which, however, is normally disengaged from the associated reset mechanism. In the reverse rotation, the motor 230 drives the operating shaft 60 through the one-way clutch 234. As in the previous case, the operating shaft 60 bears the disc 63 associated with which is the indexing mechanism indicated in the diagram by a box 57 between the disc 63 and the switch 126. A typical operating cam 67 is shown associated with one of a plurality of trip mechanisms 82 for the control pilot valves 80 and switches 81. Also mounted on the shaft 60 are indicated two single-operation cams 76 and 77 by which switches 78 and 79 may be operated at predetermined points in the cycle of operations as will now be described in connection with the circuit diagram shown in FIGURE 14.

As illustrated, the apparatus is considered at rest awaiting the initiating of a cycle of operations. The timing dial 11 rests at zero as marked by the position of dog 13A. Cam switch 79 is held in the operated position, as shown, by reason of the orientation of the cam member 77 on shaft 60 and, in this position, serves to cut off all power from the motor 230. Now, to initiate the cycle of operations, a push button 58, or any equivalent means for manually or automatically making a momentary contact, may be operated to bypass briefly the open contacts of switch 79, thereby to supply power to motor 230 to cause rotation in a "reverse" direction, whence the shaft 60 is driven through the one-way clutch 234. The initial contact is held long enough so that the indexing mechanism 57 engages a first indexing pin 65 on drum 63 and thereby closes the normally open contact of switch 126. Immediately thereafter, the cam 77, having been rotated, allows the normally-closed contacts of switch 79 to open, thus opening the push-button by-pass circuit and closing the circuit to switch 126 under whose control the action now proceeds. When the above-mentioned first indexing pin 65 disengages from the indexing mechanism, the switch 126 returns to its normal position shown in FIGURE 14, in which position power is supplied through said switch to the reversible motor 230 to cause rotation in a "forward" direction whereby the timing dial 11 is driven in a normal manner, the intervening overrunning clutch 202 being suitably engaged for driving the timing dial shaft 210, but the reset disc 204 and associated mechanism being disengaged, and the overrunning clutch 234 being also ineffective to transmit drive to the shaft 60. At the first movement of shaft 60, however, in its preceding operation, the location of the pins 70 in cams 67 has initiated various desired control actions through the agency of the pilot valves 80 and switches 81 as demanded by the specific process. Now as the timing dial 11 advances, each successive dog 13, at the proper time, initiates an indexing action, there being in general, after the zero position, one dog 13 on the timing dial for every operative indexing pin 65 on the disc 63. The operation of the indexing mechanism 57 in cooperation with each pin 13 is to operate the switch 126 thus momentarily reversing the motor 230. This acts to drive the shaft 60 until the pin 65 in cooperation with mechanism 57 resets switch 126 by means hereinbefore described, so that the switch is returned to its normal position whereby the motor resumes its normal "forward" rotation and drives the timing dial 11.

As in the former embodiment, provision is made for rapid resetting of the timing dial if less than the full timing capacity of the dial is used in a given program schedule. This is done by providing that the last operating dog 13 in use shall trip the indexing mechanism 57 whence the drum 63 will advance uninterruptedly over the unused index positions where all intervening index pins have been deactivated (65A, for example) except one final pin 65 whose action is to reset switch 126 and cause the motor to resume its "forward" rotation. At this point of reversal, a second single-operation cam switch, 76 and 78, is so positioned that its normally open contacts become closed whereby it supplies power to the solenoid 206. The solenoid acts to force the disc 204 into engagement with drive wheel 203 which, as noted above, is now being driven in a "forward" sense by motor 230. By suitable choice of the effective diameter of disc 204, the timing dial can be driven forward at a greatly accelerated rate, the clutch 202 preventing any interference between the rapid reset motion and the slower, parallel acting, synchronous timing function of motor 230. Now, the dog member 13A, situated just in advance of the zero position of the dial, finally trips the indexing mechanism 57. This opens the normally closed contact of switch 126 and closes the normally open contact whereby the motor 230 is reversed, the timing dial is stopped in its zero position, and the indexing drum 63 is advanced one step to its final position between two predetermined pins 65. This motion disengages switch 78 from cam 76, opening the reset solenoid 206. Switch 126 is at the same time reset to its normal position, but the motor 230 is not energized at this point, with the dial at its zero position, since the first cam-operated switch 79 is operated into the position shown in FIG. 14 and power is thereby removed from the motor. The system is now ready for repetition of the established cycle of operations.

An alternative form of timing dial is applicable to the hereinbefore described embodiments, being interchangeable with dials 11 or 211 thereof. This is a particularly simple and cheap modification which lends itself to making up a number of timing dials each of which represents, by its pre-arranged permanent setting of dog members, a particular set of process control conditions and, thus, each such dial may be permanently associated with a particular process. A dial may, therefore, be selected and placed on the drive spindle 15 for controlling the particular process to which the apparatus is applied.

Figure 15:
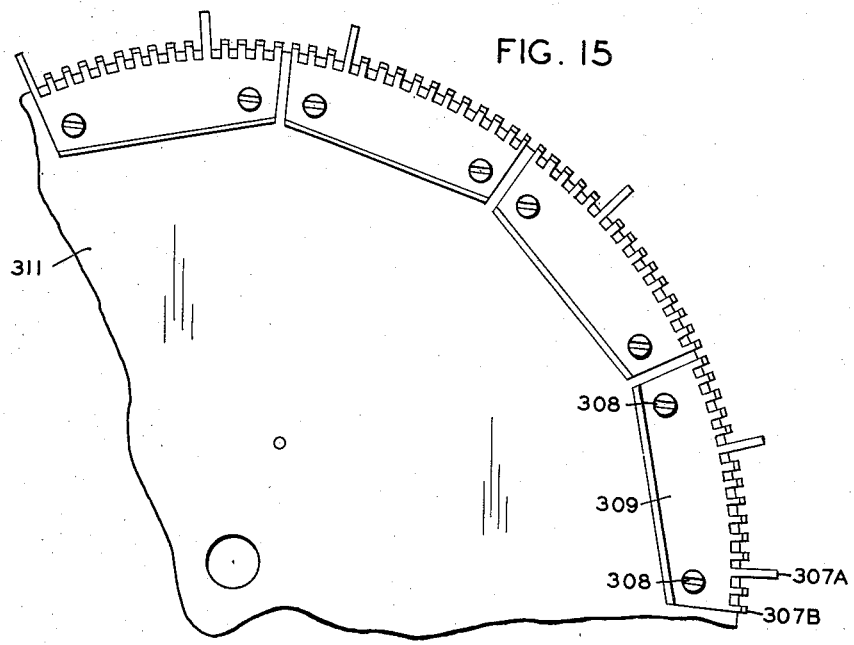
FIGURE 15 is a fragmentary face view of a modified form of timing dial.
Figure 16:
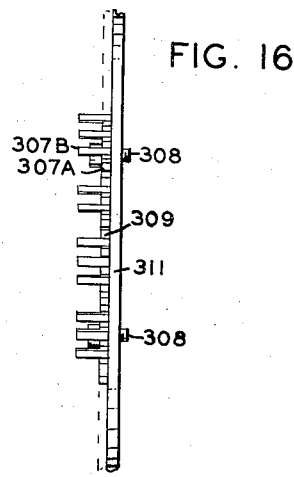
FIGURE 16 is an end elevational view thereof.

FIGURES 15 and 16 illustrate a typical dial of the modified embodiment of our invention. The flat, circular base plate is designated by numeral 311. Short segments 309 of thin metal are attached to the plate at its periphery by mounting screws 308 inserted into corresponding drilled and tapped holes in said plate. Each segment is formed of metal cut or serrated along one edge to form a plurality of more or less readily bendable teeth. With a segment fixed to the dial, these teeth 307a may serve as dog members for actuation of the indexing mechanism 57 (see, for example, FIGURE 1) or, if bent down, as teeth 307b, are removed from operational effect. Thus, a program or schedule may be prepared by bending back the teeth not wanted and leaving in place those teeth in appropriate position to serve as timing dogs, as 13 or 13A in FIGURE 1.

It will thus be apparent that any schedule of operations permitted by the form of timing dial shown in FIGURE 1 will also be possible with this modified embodiment of timing dial, and in a more or less permanent form.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. In a process cycle controller, a plurality of process controlling instrumentalities, sequencing means for operating said instrumentalities in predetermined order, means for intermittently operating said sequencing means, timing means operable at substantially constant speed in a given direction for controlling said operating means to set said sequencing means into operation, means controlled by said sequencing means for rendering said operating means ineffective to actuate said sequencing means until said operating means is again rendered effective by said timing means to set said sequencing means into operation, means responsive to completion of the process cycle for causing said operating means to reset said timing means to an initial position, and one-way transmission means between said operating means and said sequencing means for preventing operation as said sequencing means by said operating means when the latter is resetting said timing means.

2. A process cycle controller as defined by claim 1, wherein said means for causing said operating means to reset said timing means comprises connections for enabling said operating means to reset said timing means by driving the latter in the same direction in which said timing means operates in controlling said sequencing means.

3. A process cycle controller as defined by claim 1, wherein said means for causing said operating means to reset said timing means comprises connections for enabling said operating means to reset said timing means by driving the latter at a speed greater than that at which said timing means operates in controlling said sequencing means.

4. In a process cycle controller, sequencing means for establishing successive conditions in a process cycle, an electric motor, switching means for placing said motor into and out of operation in a given direction for operating said sequencing means, timing means operable at substantially constant speed, means controlled by said timing means for actuating said switching means for placing said motor in operation in said direction, means controlled by said sequencing means for actuating said switching means to throw said motor out of operation in said direction, and means controlled by said sequencing means for causing said motor to automatically reset said timing means to an initial position upon completion of a cycle of process conditions.

5. A process cycle controller as defined by claim 4, including one-way transmission means between said motor and said sequencing means for preventing operation of said sequencing means by said motor when the latter is resetting said timing means.

6. A process cycle controller as defined by claim 4, wherein said means controlled by said sequencing means for causing said motor to reset said timing means comprises connections for enabling said motor to reset said timing means by driving the latter in the same direction in which said timing means operates in controlling said switching means.

7. In a process cycle controller, sequencing means for establishing successive conditions in a process cycle, a reversible motor, connections between said motor and said sequencing means for driving the latter upon operation of said motor in a given direction, timing means operable at substantially constant speed for placing said motor in action to drive said sequencing means, and means controlled by said sequencing means for reversing the direction of operation of said motor and causing the latter to automatically reset said timing means to zero at the end of said process cycle.

8. A process cycle controller as defined in claim 7, including one-way transmission means between said motor and said sequencing means for preventing operation of said sequencing means by said motor when the latter is resetting said timing means.

9. In a process cycle controller, means for establishing successive conditions in a process cycle, a reversible motor, means between said motor and said condition-establishing means for transmitting motion from said motor to said condition-establishing means in only one direction of operation of said motor, timing means operable at substantially constant speed for controlling the operation of said motor, means for reversing the direction of operation of said motor, and means between said motor and said timing means for transmitting motion from said motor to said timing means in only said reverse direction of operation of said motor for automatically restoring said timing means to an initial position.

10. In a process cycle controller, means for establishing successive conditions in a process cycle, a reversible motor, means between said motor and said condition-establishing means for transmitting motion from said motor to said condition-establishing means in only one direction of operation of said motor, timing means operable at substantially constant speed for controlling the operation of said motor, a second motor, connections from said second motor to said timing means for driving the latter, means for reversing the direction of operation of the first motor, means between said first motor and said timing means for transmitting motion from said first motor to said timing means in only said reverse direction of operation of said first motor for restoring said timing means to an initial position, and overrunning clutch means in the connections between said second motor and said timing means for enabling the latter to be operated by said first motor independently of said second motor.

11. In a process cycle controller, means for establishing successive conditions in a process cycle, a reversible motor, means between said motor and said condition-establishing means for transmitting motion from said motor to said condition-establishing means in only one direction of operation of said motor, timing means operable at substantially constant speed for controlling the operation of said motor, a second motor, connections from said second motor to said timing means for driving the latter at said substantially constant speed, means for reversing the operation of the first motor, means between said first motor and said timing means for enabling said first motor to drive said timing means in the same direction as said second motor and at greater speed during said reverse operation of said first motor for resetting said timing means to an initial position, and overrunning clutch means in the connections between said second motor and said timing means for preventing transmission of motion from said first motor to said second motor during said resetting of said timing means.

12. In a process cycle controller, means for establishing successive conditions in a process cycle, a reversible motor, means between said motor and said condition-establishing means for transmitting motion from said motor to said condition-establishing means in only one direction of operation of said motor, timing means operable at substantially constant speed for controlling the operation of said motor, a second motor, connections from said second motor to said timing means for driving the latter at said substantially constant speed, means for reversing the operation of the first motor, connections between said first motor and said timing means for resetting the latter to an initial position during said reverse motion of said first motor, overrunning clutch means in said connections for preventing transmission of motion from said second motor to said first motor during operation of said timing means by said second motor, and overrunning clutch means in the connections between said second motor and said timing means for preventing transmission of motion from said first motor to said second motor during resetting of said timing means by said first motor.

13. In a process cycle controller, sequencing means for establishing successive conditions in a process cycle, timing means for controlling operations of said sequencing means, a motor, means connecting said motor for driving said sequencing means and said timing means for operating the latter at substantially constant speed, and means responsive to completion of the process cycle for connecting said motor for driving said timing means in the same direction but at greater speed for automatically restoring said timing means to an initial position.

14. In a process cycle controller, sequencing means for establishing successive conditions in a process cycle, timing means for controlling operations of said sequencing means, a reversible motor, means connecting said motor to said timing means for operating the latter at substantially constant speed during operation of said motor in one direction, means responsive to completion of the process cycle for connecting said motor for driving said timing means in the same direction but at greater speed for automatically restoring said timing means to an initial position, and means connecting said motor to said sequencing means for operating the latter during operation of said motor in the reverse direction.

15. In a process cycle controller, sequencing means for establishing successive conditions in a process cycle, a motor for operating said sequencing means, a switch for controlling energization of said motor, timing means operable at substantially constant speed, a pivoted member for operating said switch, means biasing said member into operating position, a pivoted latch member for restraining the latter against movement into operating position, and means operable by said timing means for releasing said operating member from said latch to effect operation of said switch and thereby energize said motor to operate said sequencing means.

16. In a process cycle controller, sequencing means for establishing successive conditions in a process cycle, a motor for operating said sequencing means, a switch for controlling energization of said motor, timing means operable at substantially constant speed, a pivoted member for operating said switch, means biasing said member into operating position, a pivoted latch member for restraining the latter against movement into operating position, means operable by said timing means for releasing said operating member from said latch to effect operation of said switch, and means operable by said sequencing means for actuating said latch to cause restoration of said operating member to normal position.

17. In a process cycle controller, timing means, a switch, a pivoted element for operating said switch, spring means biasing said element into position for operating said switch, a member pivotally mounted on said element, a latch engageable with said member for holding said element against movement by said spring, said latch being mounted for pivotal movement about the same axis as said element, means operable by said timing means for pivoting said member out of engagement with said latch, thereby freeing said element for movement to a position to effect operation of said switch, and means for restoring said element to normal position.

18. In a process cycle controller, timing means, a switch, a pivoted element for operating said switch, spring means biasing said element into position for operating said switch, a latch for holding said element against operation by said spring, a member movably mounted on said element, spring means biasing said member into a position wherein it is engaged by said latch, and means operable by said timing means for shifting said member out of engagement with said latch to release said element for movement to a position for effecting operation of said switch.

19. In a process cycle controller, timing means, a switch, a pivoted element for operating said switch, spring means biasing said element into position for operating said switch, a latch for holding said element against operation by said spring, a member movably mounted on said element, spring means biasing said member into a position wherein it is engaged by said latch, and means operable by said timing means for shifting said member out of engagement with said latch to release said element for movement to a position for effecting operation of said switch, said latch being mounted for pivotal movement about the same axis as said element.

20. In a process cycle controller, timing means, a switch, a pivoted element for operating said switch, spring means biasing said element into position for operating said switch, a latch for holding said element against operation by said spring, a member movably mounted on said element, spring means biasing said member into a position wherein it is engaged by said latch, means operable by said timing means for shifting said member out of engagement with said latch to release said element for movement to a position for effecting operation of said switch, and means cooperating with said latch for reengaging the latter with said member and restoring said element to normal position.

21. A process controller as defined by claim 18, wherein the means for shifting said member out of engagement with said latch comprises a pin on said member operable by said timing means.

22. A process controller as defined by claim 18, wherein the means for shifting said member out of engagement with said latch comprises a pin on said member operable by said timing means, and means yieldably mounting said pin for retraction.

23. In a process cycle controller, timing means, a switch, a pivoted element for operating said switch, a first spring biasing said element into position for operating said switch, a latch, a movable member on said said element engageable with said latch, a second spring connected to said latch for maintaining the latter in engagement with said member for holding said element against movement by the first mentioned spring, means operated by said timing means for shifting said movable member out of engagement with said latch to release said element to the action of the first mentioned spring to effect operation of said switch, and means for reengaging said latch with said movable member and releasing said latch to the action of the second mentioned spring for retracting said element from switch operating position against the action of the first mentioned spring.

24. In a process cycle controller, timing means, a switch, a pivoted element for operating said switch, a first spring biasing said element into position for operating said switch, a latch, a movable member on said element engageable with said latch, a second spring connected to said latch for maintaining the latter in engagement with said member for holding said element against movement by the first mentioned spring, means operated by said timing means for shifting said movable member out of engagement with said latch to release said element to the action of the first mentioned spring to effect operation of said switch, and means for reengaging said latch with said movable member and releasing said latch to the action of the second mentioned spring for retracting said element from switch operating position against the action of the first mentioned spring, said latch being mounted for pivoted movement about the same axis as said element.

25. In a process cycle controller, sequencing means for establishing successive conditions in a process cycle, a switch for controlling operation of said sequencing means, a timing member rotatable at substantially constant speed, said timing member having a groove forming an outer face in one side of said timing member adjacent its rim, and elements carried by said timing member, each of said elements being of generally U-shape and fitting over said rim, the arms of each said element extending over portions of the sides of said timing member adjacent said rim, one of said arms being provided with a screw engageable with the outer face of said groove for releasably securing said element in desired positions on said timing member, and a portion of said element extending beyond said rim for operating said switch.

26. In a process cycle controller, a plurality of process controlling instrumentalities, sequencing means for causing operation of said instrumentalities at predetermined points in the cycle, said sequencing means including a plurality of discs, each disc having an element mounted thereon for adjustment to desired positions for causing operation of a corresponding instrumentality at desired times, each of said elements comprising a pair of arms of resilient metal extending along opposite faces of said disk adjacent the rim thereof, and also having a projection extending laterally with respect to the disc, said disc having a plurality of apertures therein, and one of said arms having a projection engageable with any of said apertures for retaining said element in position on said disc.

27. In a process cycle controller, a plurality of process controlling instrumentalities, sequencing means for causing operation of said instrumentalities at predetermined points in the cycle, said sequencing means including a plurality of discs, each disc having an element mounted thereon for adjustment to desired positions for causing operation of a corresponding instrumentality at desired times, each of said elements comprising a pair of arms of resilient metal extending along opposite faces of said disc adjacent the rim thereof, said arms being joined together at one end to form an integral, laterally extending, projection, said disc having notches in its rim, each adapted to receive said element with the arms thereof extending along opposite faces of the disc, said discs also having apertures, and one of said arms having a projection engageable with any of said apertures for retaining said element in position on said disc.

28. In a process cycle controller, a plurality of process controlling instrumentalities, sequencing means for causing operation of said instrumentalities at predetermined points in the cycle, said sequencing means including a plurality of discs, each disc having an element mounted thereon for adjustment to desired positions for causing operation of a corresponding instrumentality at desired times, each of said elements comprising a pair of arms of resilient metal extending along opposite faces of said disc adjacent the rim thereof, said arms being joined together at one end to form an integral, laterally extending, projection, said disc having notches in its rim, each adapted to receive said element with the arms thereof extending along opposite faces of the disc, said discs also having apertures, and one of said arms having a projection engageable with any of said apertures for retaining said element in position on said disc, said apertures extending completely through said disc to enable said element to be applied with its lateral projection extending from either face of said disc.

29. In a process cycle controller, a plurality of process controlling instrumentalities, sequencing means for causing operation of said instrumentalities at predetermined points in the cycle, a motor for operating said sequencing means, a switch for controlling energization of said motor, timing means operable at substantially constant speed, a drum rotatable with said sequencing means, a pivoted member for operating said switch, means biasing said member into operating position, a pivoted latch member for restraining the latter against movement into operating position, means operable by said timing means for releasing said operating member from said latch to effect operation of said switch, and means comprising pins on said drum for actuating said latch to cause restoration of said operating member to normal position, said drum having apertures in opposite faces thereof, said pins being movable from either face to the other of said drum, the pins on one face of said drum being in position for actuating said latch and those on the other face being out of operative position.

References Cited in the file of this patent

UNITED STATES PATENTS

| | | |
|---|---|---|
| 2,146,562 | Cameron | Feb. 7, 1939 |
| 2,231,603 | Sprenger | Feb. 11, 1941 |
| 2,421,481 | Collins | June 3, 1947 |
| 2,442,835 | Allen | June 8, 1948 |
| 2,510,666 | Sprenger | June 6, 1950 |
| 2,535,001 | Truesdell | Dec. 19, 1950 |
| 2,637,835 | Davidson | May 5, 1953 |
| 2,662,943 | Morrison | Dec. 15, 1953 |
| 2,688,982 | Whitworth | Sept. 14, 1954 |
| 2,742,085 | Bennet et al. | Apr. 17, 1956 |
| 2,832,856 | Goodhouse | Apr. 29, 1958 |
| 2,852,957 | Breitenstein | Sept. 23, 1958 |
| 2,858,496 | Davis | Oct. 28, 1958 |
| 2,870,278 | Shelton et al. | Jan. 20, 1959 |
| 2,898,937 | Williams | Aug. 11, 1959 |
| 2,940,317 | Goodhouse | June 14, 1960 |

FOREIGN PATENTS

| | | |
|---|---|---|
| 314,461 | Switzerland | July 31, 1956 |